US008364646B2

(12) United States Patent  
Hanna et al.

(10) Patent No.: US 8,364,646 B2
(45) Date of Patent: Jan. 29, 2013

(54) SCALABLE SEARCHING OF BIOMETRIC DATABASES USING DYNAMIC SELECTION OF DATA SUBSETS

(75) Inventors: Keith J. Hanna, Princeton Junction, NJ (US); Hector T. Hoyos, New York, NY (US)

(73) Assignee: Eyelock, Inc., Tolima Valley Caguas, PR (US)

( * ) Notice: Subject to any disclaimer, the term of this patent is extended or adjusted under 35 U.S.C. 154(b) by 1730 days.

(21) Appl. No.: 11/713,894

(22) Filed: Mar. 5, 2007

(65) Prior Publication Data

US 2007/0206839 A1   Sep. 6, 2007

Related U.S. Application Data

(60) Provisional application No. 60/767,114, filed on Mar. 3, 2006.

(51) Int. Cl.
*G06F 17/30* (2006.01)
(52) U.S. Cl. ........................................ 707/662
(58) Field of Classification Search .................. None
See application file for complete search history.

(56) References Cited

U.S. PATENT DOCUMENTS

| | | | |
|---|---|---|---|
| 4,641,349 A | 2/1987 | Flom et al. | |
| 5,259,040 A | 11/1993 | Hanna | |
| 5,291,560 A | 3/1994 | Daugman | |
| 5,488,675 A | 1/1996 | Hanna | |
| 5,572,596 A | 11/1996 | Wildes et al. | |
| 5,581,629 A | 12/1996 | Hanna et al. | |
| 6,070,159 A * | 5/2000 | Wilson et al. | 1/1 |
| 6,182,076 B1 * | 1/2001 | Yu et al. | 713/186 |
| 6,247,813 B1 | 6/2001 | Kim et al. | |
| 6,341,169 B1 * | 1/2002 | Cadorette et al. | 382/115 |
| 6,714,665 B1 | 3/2004 | Hanna et al. | |
| 6,760,467 B1 | 7/2004 | Min et al. | |
| 7,277,891 B2 * | 10/2007 | Howard et al. | 707/707 |
| 7,801,335 B2 | 9/2010 | Hanna et al. | |
| 7,802,724 B1 * | 9/2010 | Nohr | 235/384 |
| 2004/0258281 A1 * | 12/2004 | Delgrosso et al. | 382/115 |
| 2005/0229007 A1 | 10/2005 | Bolle et al. | |

OTHER PUBLICATIONS

B. Galvin, et al., Recovering Motion Fields: An Evaluation of Eight Optical Flow Algorithms, Proc. of the British Machine Vision Conf. (1998).
J. R. Bergen, et al., Hierarchical Model-Based Motion Estimation, European Conf. on Computer Vision (1993).
K. Nishino, et al., The World in an Eye, IEEE Conf. on Pattern Recognition, vol. 1, at pp. 444-451 (Jun. 2004).
Notice of Allowance on U.S. Appl. No. 11/559,381 dated May 18, 2010. R. Kumar, et al., Direct recovery of shape from multiple views: a parallax based approach, 12th IAPR Int'l Conf. on Pattern Recognition.
R. P. Wildes, Iris Recognition: An Emerging Biometric Technology, Proc. IEEE 85(9) at pp. 1348-1363 (Sep. 1997).

\* cited by examiner

*Primary Examiner* — Bai D. Vu
(74) *Attorney, Agent, or Firm* — John D. Lanza; Foley and Lardner LLP

(57) ABSTRACT

A method of searching a biometric database includes storing biometric data corresponding to a number of users in a database, and defining one or more data subsets in the database according to inputs from users expecting to pass through a given biometric acquisition device that is linked with the database within a certain time period. A search initiated by the given acquisition device at a given time is then scaled down to only those data subsets defined by the inputs from those users expecting to pass through the acquisition device at the given time. This modification of the database and database search is performed continuously and automatically based on dynamic information provided by other automatic and/or manual systems, and then optionally the information on the databases can be automatically modified or deleted based either on a biometric match result or based on rules encoded in the database records.

14 Claims, 2 Drawing Sheets

SCALABLE SEARCHING OF BIOMETRIC DATABASES USING DYNAMIC SELECTION OF DATA SUBSETS

CROSS REFERENCE TO RELATED APPLICATION

This application claims priority under 35 U.S.C. §119(e) of U.S. Provisional Patent Application No. 60/767,114 filed Mar. 3, 2006, in the names of the present inventors and entitled "Method for Scalable Search of Biometric Databases by Dynamic Selection of a Subset of the Database".

BACKGROUND OF THE INVENTION

1. Field of the Invention

This invention relates to biometric data processing and retrieval.

2. Discussion of the Known Art

Biometrics is concerned with measurements of human characteristics, such as the unique pattern of a person's iris or fingerprint, or locations of features on the person's face. Measurements may be recorded at one instant of time, stored in a database, and then compared with new measurements taken and recorded at a later time. An example of a method for computing a biometric measurement is described in U.S. Pat. No. 5,291,560 "Biometric personal identification system based on iris analysis".

For security applications involving, e.g., access control or identification of individual passengers at airport terminals, biometrics has the advantage that it is difficult or impossible to transfer one individual's biometric measurements to a second individual. On the other hand, tokens such as entry keys can be easily passed between individuals.

The ability of biometric measurements to differentiate one person from another depends on conditions under which measurements are recorded, as well as on the biometric itself. For example, it has been shown that the human iris is highly unique and therefore can be used to identify a single person even within a relatively large database. In the case of an iris biometric, studies have shown that the size of an iris database may have up to 1.2 million records and still allow for a unique match. In the case of a face biometric, the corresponding database must typically be orders of magnitude smaller for optimal performance. Also, the larger the biometric database, the longer any system takes to search through it.

Scalability may not be a problem when a particular biometric deployment has a small number of enrollees, but as biometric technologies become more widespread, there is a need for a process to maintain a database with a large number of enrollees that will enable a unique matching capability and at the same time be convenient for the user.

An approach taken toward resolving the problem of scalability of large biometric databases has been to use a smart card or a swipe card at or near a given biometric device. The concept is that unique biometric information contained in the smart card or swipe card essentially reduces the "database" to a size of just one. While the approach appears attractive from the viewpoint of the biometric matching, there unfortunately is a cost to issuing and maintaining smart/swipe cards, and further, such cards are inconvenient for users and slows down throughput at the biometric device.

Biometrics may be applied in two ways, namely, (i) verification, wherein a separate token is used to locate a single candidate record in a biometric database with which acquired biometric data is compared, and (ii) recognition, wherein a separate token is not used, and user data is acquired on site by a biometric device and then compared with all records in a database. Advantages of the recognition approach are that the user does not need to carry a token, the system operator does not have to manage issuance or loss of the token, and the throughput of users through a biometric system is not slowed by having to follow a process in which a token must be read. Disadvantages of the recognition approach compared to verification are that more processing must be performed in searching through a database, and the volume of data transmitted between the database and a matching processor is much larger and thus may overcome the capacity of a network if several biometric acquisition devices are installed in the network, resulting in an unacceptable response time. Further, even a momentary failure in the network between the matching processor and the database can result in an immediate system failure. Methods have been developed that attempt to improve the efficiency of storage and search through a large database, for example, U.S. Pat. No. 6,070,159 "Method and Apparatus for Expandable Biometric Searching".

It is typical in access control and other security applications that the rate at which user data is added to a database is much smaller than the rate at which users are scanned and the database is searched. This means that the contents of the database are relatively static, and that the processes in place for managing the database (e.g., adding or deleting records) are essentially manual. Therefore, the database management can be inefficient and difficult to administer in certain applications where the throughput of users is very high compared to other applications, e.g., the identification of passengers at airport terminals or of visitors entering buildings.

SUMMARY OF THE INVENTION

According to one aspect of the invention, a method of searching a biometric database includes storing biometric data corresponding to a number of users in a common database, defining one or more data subsets in the database according to inputs from users expecting to pass through a given biometric acquisition device that is linked with the database within a certain time period, and scaling a search initiated by the given acquisition device at a given time to only those data subsets defined by the inputs from those users expecting to pass through the acquisition device at the given time.

According to another aspect of the invention, a method of searching a first biometric database includes storing biometric data corresponding to a number of users in a second database, defining one or more data subsets in the second database according to inputs from users expecting to pass through a given biometric acquisition device that is linked with the first database within a certain time period, transmitting the data subsets from the second database to the first database, and scaling a search initiated by the given acquisition device at a given time to only the data subsets contained in the first database as defined by the inputs from those users expecting to pass through the acquisition device at the given time.

In another aspect of the invention, we describe a scalable, fault-tolerant biometric matching system that automatically and continually distributes data to local databases attached to multiple biometric acquisition devices based on dynamic information provided by other automatic and/or manual systems, and then optionally automatically modifies or deletes the information on the local databases based either on a biometric match result or based on rules encoded in the database records.

For a better understanding of the invention, reference is made to the following description taken in conjunction with the accompanying drawing and the appended claims.

DETAILED DESCRIPTION OF THE INVENTION

Figure 1:
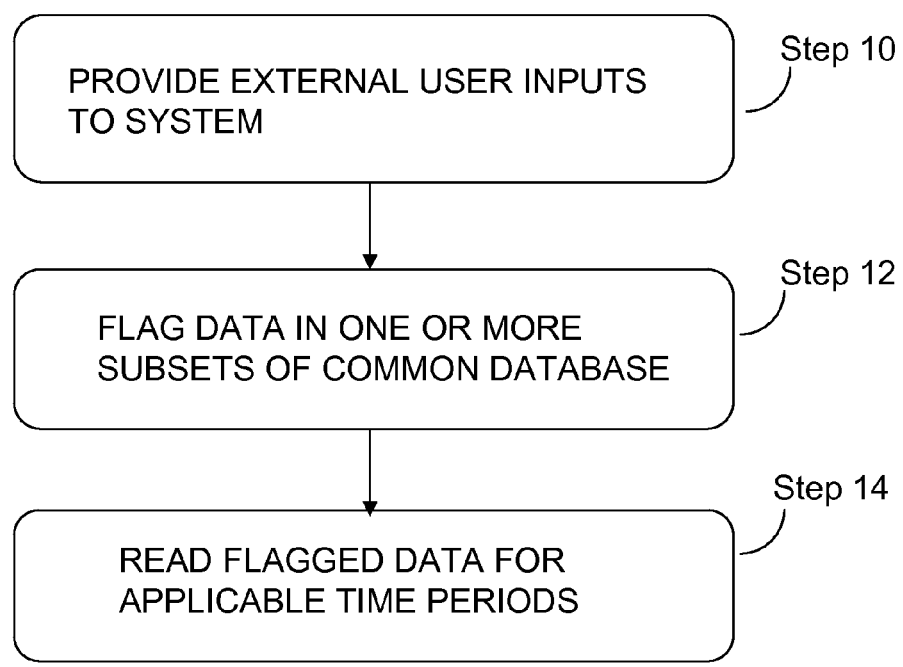
FIG. 1 is a flow chart showing steps of a first embodiment of the invention.

FIG. 1 depicts a first embodiment of a scalable biometric database searching technique according to the invention. Rather than attempt to search through an entire biometric database, or retrieve and match an individual biometric record based on a smart card or a swipe card held by a user, searching is performed only with respect to one or more subsets of the database which subsets are defined according to certain external inputs which may be manual or automatic as defined below. Specifically the subsets are defined and selected dynamically as opposed to a fixed segregation of the database based, e.g., on geographic region, company, or other fixed attribute.

In step 10, external inputs are provided to a biometric data processing system so as to identify candidate subjects (users) who may or may not pass through one or more biometric devices or readers that share a common database of the system within a given time period. The input does not need to be provided physically at a given biometric reader, nor does it need to be provided concurrently when the biometric reading is being performed.

For example, in an airport traveler application, a given traveler may dial a phone number, and a unique originating phone number of the traveler is used to flag the traveler's biometric record (which includes his/her phone number) in the database. Many other travelers may also repeat the same process, each with their own unique originating phone number and each subsequently flagging their record in the database.

In step 12, the common database maintains the flagged data in one or more subsets for a certain period of time which may vary depending on the application, for example, 1 to 2 days. A given biometric reader in the system may then be alerted to the fact that one or more travelers whose data has been flagged in the database, may be present at the given reader within the 1 to 2 day period. After the 1 to 2 day period, the flags are reset automatically. Thus, in step 14, when the travelers present themselves at the reader within the set period, the system only searches through a subset of the database containing biometric records that were dynamically flagged by those travelers expected to pass through the reader during the same period. Accordingly, there is only a requirement to search a subset of the database at any one time.

The above technique is not limited just to telephone dial-in inputs. Other user or traveler input methods may be used such as, for example, via an Internet web page or by e-mail. Nor does the input have to originate from the user. For example, an e-mail or other message can be sent to users to inform them of a temporary Personal Identification Number (PIN). The PIN could also be printed on their travel ticket. Even if the PIN is only four digits long, the database subset size can be 10,000 smaller than the original database size. This particular PIN approach is much more secure than current PIN approaches since the PIN is dynamic and not fixed.

Figure 2:
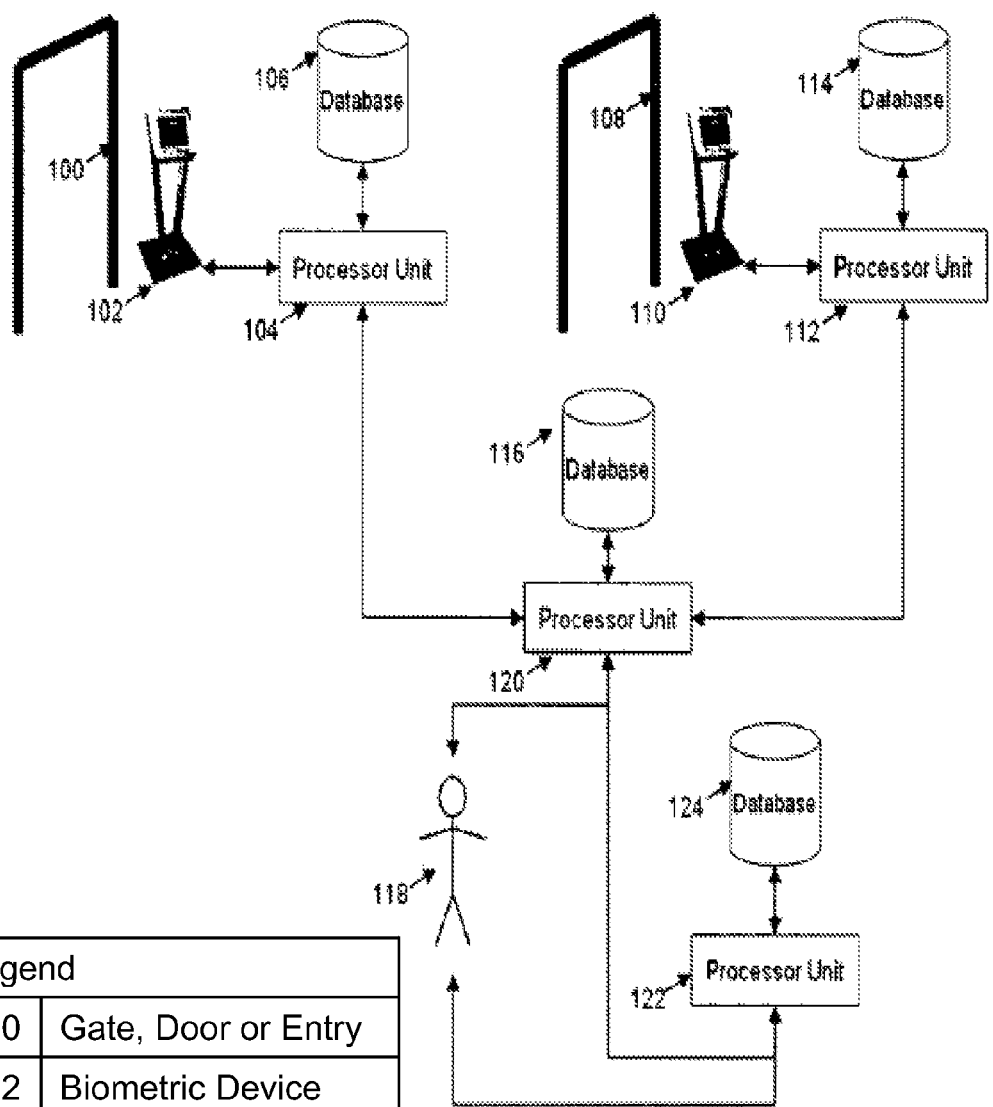
FIG. 2 is a schematic block diagram of a biometric data processing and retrieval system according to a second embodiment of the invention.

FIG. 2 depicts a second embodiment of a scalable biometric database searching technique according to the invention. In FIG. 2, a scalable, fault-tolerant biometric matching system automatically and continually distributes data to local databases 106, 114 associated with corresponding biometric acquisition devices 102, 110, based on dynamic information provided by other automatic and/or manual systems. The information at the local databases 106, 114 may optionally be automatically modified or deleted the information based either on a biometric match result, or based on rules encoded in the database records.

A biometric acquisition device 102, 110 is optionally located, for example, near an airport entry door, airport boarding gate, or an associated building entry 100, 108. The acquisition devices 102, 110 are connected to corresponding biometric processor units 104, 112, and the processor units 104, 112 are connected to their associated local databases 106, 114. Additional processor units and biometric acquisition devices may be connected in this manner. Two biometric acquisition devices and processor units are shown in FIG. 2 for illustrative purposes only and without intending to limit the scope of the invention.

The processor unit 104 and the local database 106 are connected by a high reliability link and may physically reside together. For example, the database 106 may reside in Dynamic Random Access Memory (DRAM) that is directly addressed by the processor unit 104. Similarly, the biometric acquisition device 102 and the processor unit 104 are also connected by a high-reliability link, for example, an RS-232 link or a PCI bus interface. As discussed below, the use of the local database together with high reliability local links allows the overall system to maintain operation for a certain time period even if links with remote system databases 116, 124 are severed due to maintenance or other network outage.

The biometric processor units 104, 112 are each connected with a remote processor unit 120 that connects with a first remote database 116. The remote processor unit 120 also connects with a second remote processor unit 122 that may be connected with an optional second remote database 124.

The second remote processor unit 122 may run a third party application, such as, e.g., the departure control system (DCS) for an airport. Information such as passenger name, flight number, time and gate number are automatically sent from the second remote database 124 to the first remote processor unit 120. Remote processing unit 120 then inspects the information and, if biometric data is not part of the record information, then the processor unit 120 uses one or more of the records to index into a biometric field in a record stored on the first remote database 116.

Remote processor 120 uses a set of rules that are either encoded in the information, or are pre-programmed into processor unit 120 to determine (i) to which local database 106, 114 a subset of the information should be sent via processor units 104, 112 based, for example, on gate information which uniquely identifies the locations of the biometric acquisition devices 102, 110, (ii) under what conditions and at what time the data should be sent to local databases 106, 114, and (iii) under what conditions and at what time the data should be automatically modified or deleted from local databases 106, 114.

For example, data may be transmitted from remote database 116 to local database 106 one hour before a particular flight and such data may be deleted when the flight has officially departed, if the second remote processor 122 is chosen to be a departure control system (DCS); or the data may be deleted once a user has actually passed through one of the biometric acquisition devices 102, 110.

Alternatively, a user 118 may be involved in an automatic process initiated by the second remote processor unit 122. For example, second remote database 124 may contain either fixed data fields (such as, e.g., a cell phone numbers of a user), or a variable data fields (such as, e.g., an itinerary number for a particular journey). User 118, who may be an actual user of the biometric system or their representative, then sends information to processor unit 120 using, e.g., a cell-phone call, text messaging system, or e-mail. The information sent can simply be the phone number from which a call was derived, using automatic reverse look-up methods that are known in the art, or the transmission of a number by text messaging.

Processor unit 120 then automatically compares the information sent by user 118 to the information sent by the second remote processor 122 to determine (i) which biometric record should be extracted from the database 116, (ii) to which local database 106, 114 the record should be sent, and (iii) under what conditions the record should be managed. This kind of user assistance may be desired if the applications running on the second remote processor unit 122 and first remote processor unit 120 are unable to guarantee that the number of active users that are being searched biometrically via a given acquisition device 102, 110 is larger than the ability of the system to identify an individual uniquely. In this case, the user's input provides additional information that the processor unit 120 (and, optionally, processor unit 122) can use to reduce the number of active users being searched at a given biometric device 102,110.

Accordingly, large numbers of different users are allowed to pass through the biometric devices 102, 110 continually without the need for large databases situated locally with the devices. Only the relatively small databases 106,114 are required locally. The arrangement of FIG. 2 has significant security benefits. For example, in case of theft of data or equipment locally, then only those records of a relatively small number of users may be affected.

While the foregoing represents preferred embodiments of the invention, it will be understood by those skilled in the art that various modifications and changes may be made without departing from the spirit and scope of the invention, and that the invention includes all such modifications and changes as come within the scope of the following claims.

We claim:

1. A method of modifying a first biometric database, comprising:
    storing biometric data corresponding to a number of users in a second database;
    defining one or more data subsets in the second database based on users expecting to pass through a given biometric acquisition device within a certain time period, the biometric acquisition device linked with the first database and located at or near one of: an airport entry, a passenger boarding gate and a building entry;
    transmitting the data subsets from the second database to the first database; and
    deleting one or more records in the first database in response to biometric matching using information stored in one or more fields of the one or more biometric records.

2. The method of claim 1, wherein storing biometric data comprises storing iris data.

3. The method of claim 1, further comprising defining one or more data subsets in the second database based on a user dialing a phone number, sending an email, sending a text message or entering information at a web page.

4. The method of claim 3, further comprising identifying the user based on an originating phone number or identifier of the user.

5. The method of claim 4, further comprising flagging the user's biometric record for the one or more data subsets based on the originating phone number or identifier of the user.

6. The method of claim 1, further comprising defining one or more data subsets in the second database based in part on one or more of: passenger name, flight number, flight time, gate number, itinerary identifier and location of the biometric acquisition device.

7. A method of modifying a first biometric database, comprising:
    storing biometric data corresponding to a number of users in a second database;
    defining one or more data subsets in the second database based on users expecting to pass through a given biometric acquisition device within a certain time period, the biometric acquisition device linked with the first database;
    transmitting the data subsets from the second database to the first database;
    deleting one or more records in the first database in response to biometric matching using information stored in one or more fields of the one or more biometric records; and
    deleting one or more records in the first database when an associated flight has departed from where the biometric acquisition device is located.

8. A system for modifying a biometric database, comprising:
    a biometric acquisition device located at or near one of: an airport entry, a passenger boarding gate and a building entry;
    a first database linked to the biometric acquisition device; and
    a second database storing biometric data corresponding to a number of users, from which one or more data subsets are defined based on users expecting to pass through the biometric acquisition device within a certain time period, the second database transmitting the one or more data subsets to the first database,
    wherein one or more records are deleted in the first database in response to biometric matching using information stored in one or more fields of the one or more biometric records.

9. The system of claim 8, wherein second database stores biometric data that comprises iris data.

10. The system of claim 8, wherein the one or more data subsets in the second database are defined based on a user dialing a phone number, sending an email, sending a text message or entering information at a web page.

11. The system of claim 10, wherein the one or more data subsets in the second database are defined based on an originating phone number or identifier of the user.

12. The system of claim 8, further comprising a departure control system.

13. The system of claim 8, wherein the one or more data subsets in the second database are defined based in part on one or more of: passenger name, flight number, flight time, gate number, itinerary identifier and location of the biometric acquisition device.

14. A system for modifying a biometric database, comprising:
    a biometric acquisition device;
    a first database linked to the biometric acquisition device; and a second database storing biometric data corresponding to a number of users, from which one or more data subsets are defined based on users expecting to pass through the biometric acquisition device within a certain time period, the second database transmitting the one or more data subsets to the first database, wherein one or more records in the first database are deleted in response to biometric matching using information stored in one or more fields of the one or more biometric records, wherein one or more records in the first database are deleted when an associated flight has departed from where the biometric acquisition device is located.

* * * * *